United States Patent [19]
Wherry et al.

[11] 3,881,577
[45] May 6, 1975

[54] HITCH WITH TRAILER BRAKE ACTUATOR

[75] Inventors: Joseph L. Wherry, Perryburg; Eugene DeAngelis, Toledo, both of Ohio

[73] Assignee: Toledo Stamping & Manufacturing Company, Toledo, Ohio

[22] Filed: Aug. 2, 1973

[21] Appl. No.: 385,188

[52] U.S. Cl. .............................. 188/112; 188/3 R
[51] Int. Cl. .............................................. B60f 7/20
[58] Field of Search .................... 188/112, 3 R, 142

[56] References Cited
UNITED STATES PATENTS

| | | | |
|---|---|---|---|
| 3,180,454 | 4/1965 | Angelis et al. | 188/112 |
| 3,215,230 | 11/1965 | Wherry | 188/112 |

*Primary Examiner*—Trygve M. Blix
*Assistant Examiner*—Sherman D. Basinger
*Attorney, Agent, or Firm*—Allen D. Gutchess, Jr.

[57] ABSTRACT

A trailer hitch and brake actuator having lower production costs and improved operation is provided. The housings of the actuator are of stamped, low cost construction, employing fewer separate pieces. The actuator includes a rear component carrying a brake cylinder with a spring on the piston rod of the brake cylinder being engaged by a rigid member which is movable with a forward component and is connected directly with a shock absorber. The shock absorber is carried by the rear component and is parallel to the piston rod of the brake cylinder and to the movement of the forward component of the actuator. The brake cylinder is located directly above the shock absorber to minimize the space required and accordingly enable the actuator to be reduced in size. The forward component is of tubular cross section and is received in a passage of the rear actuator component and slidably carried thereby through plastic bearings. The actuator also has a break-away lever employing an over-center linkage with the lever acting on the brake piston rod spring and moved to an over-center position by a flexible link attached to the towing vehicle in the event the trailer becomes separated therefrom.

19 Claims, 9 Drawing Figures

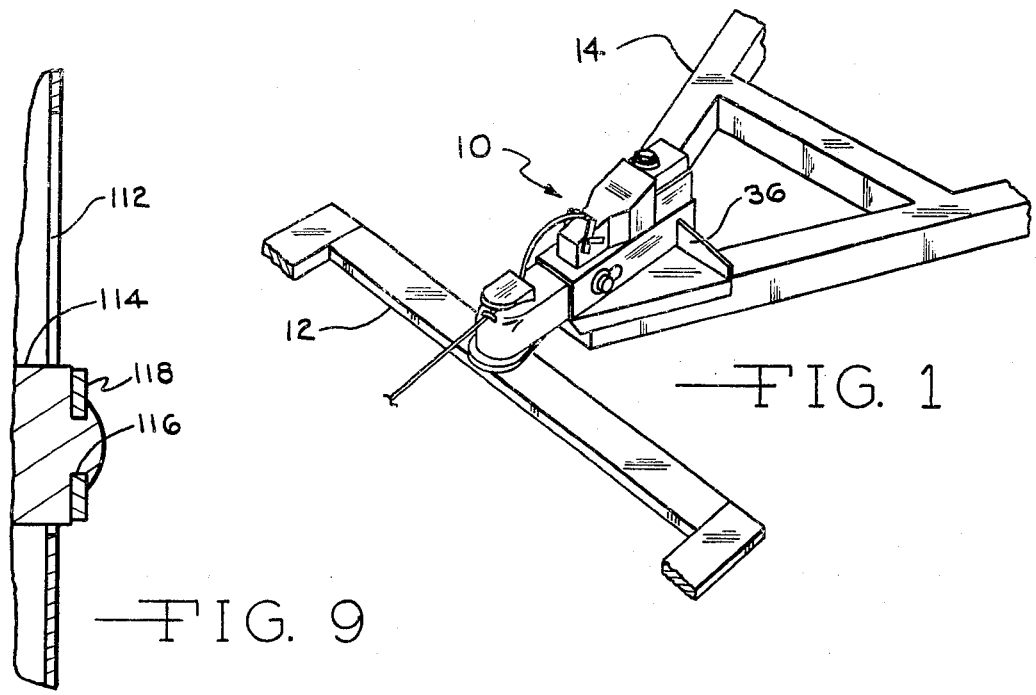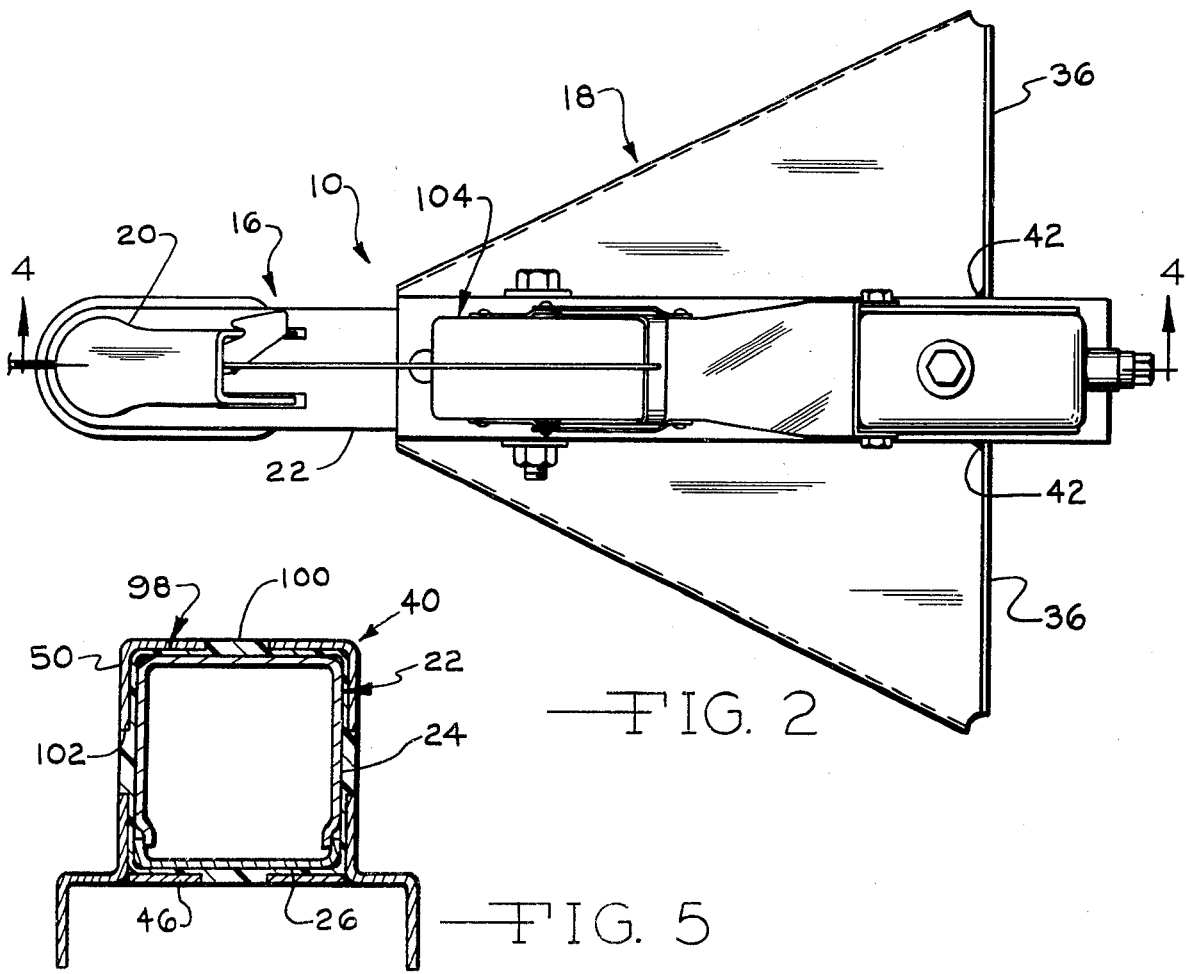

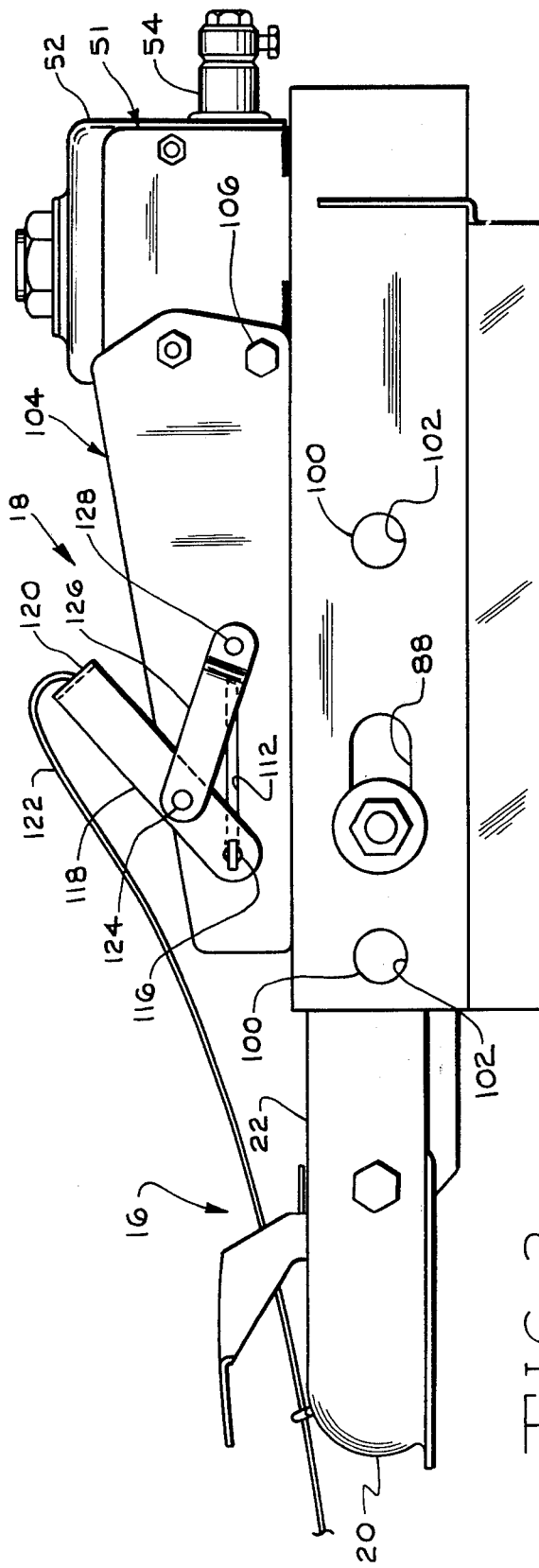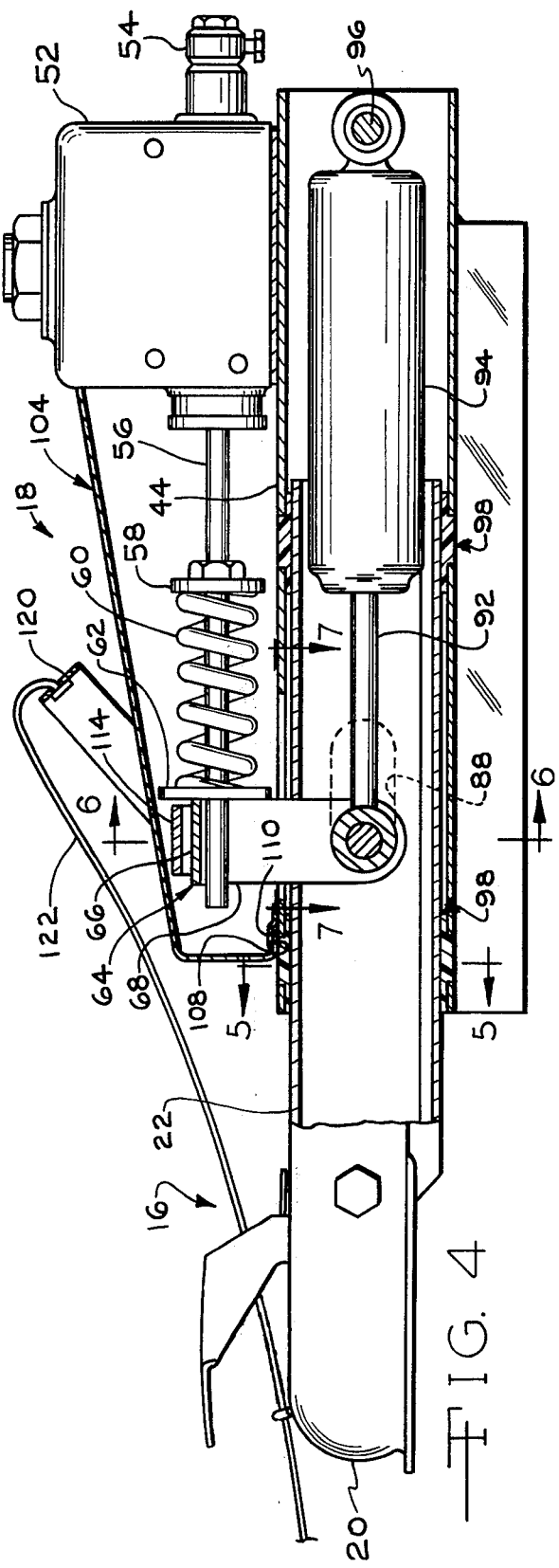

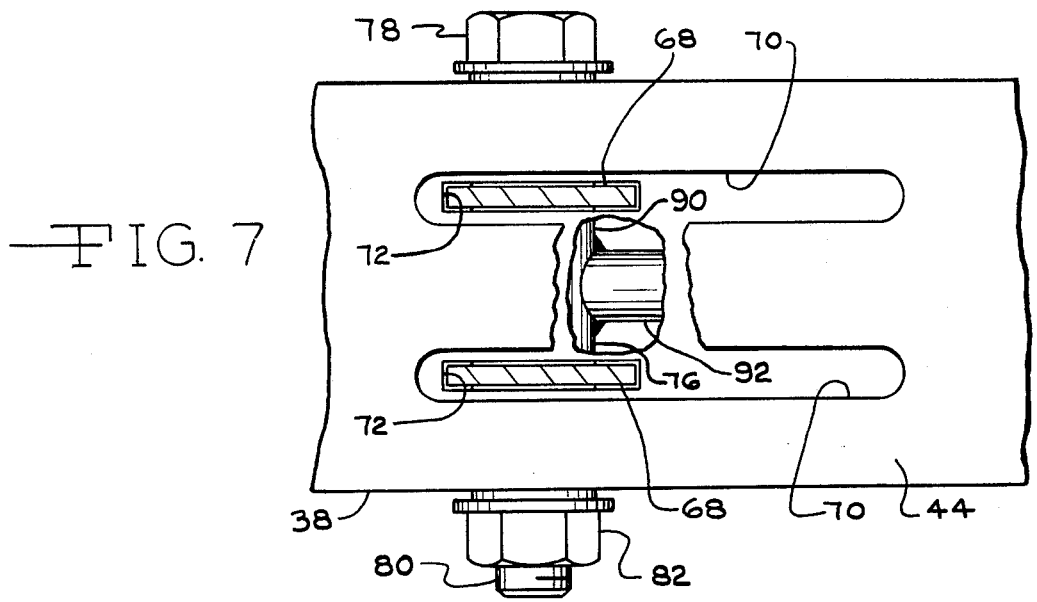
FIG. 7
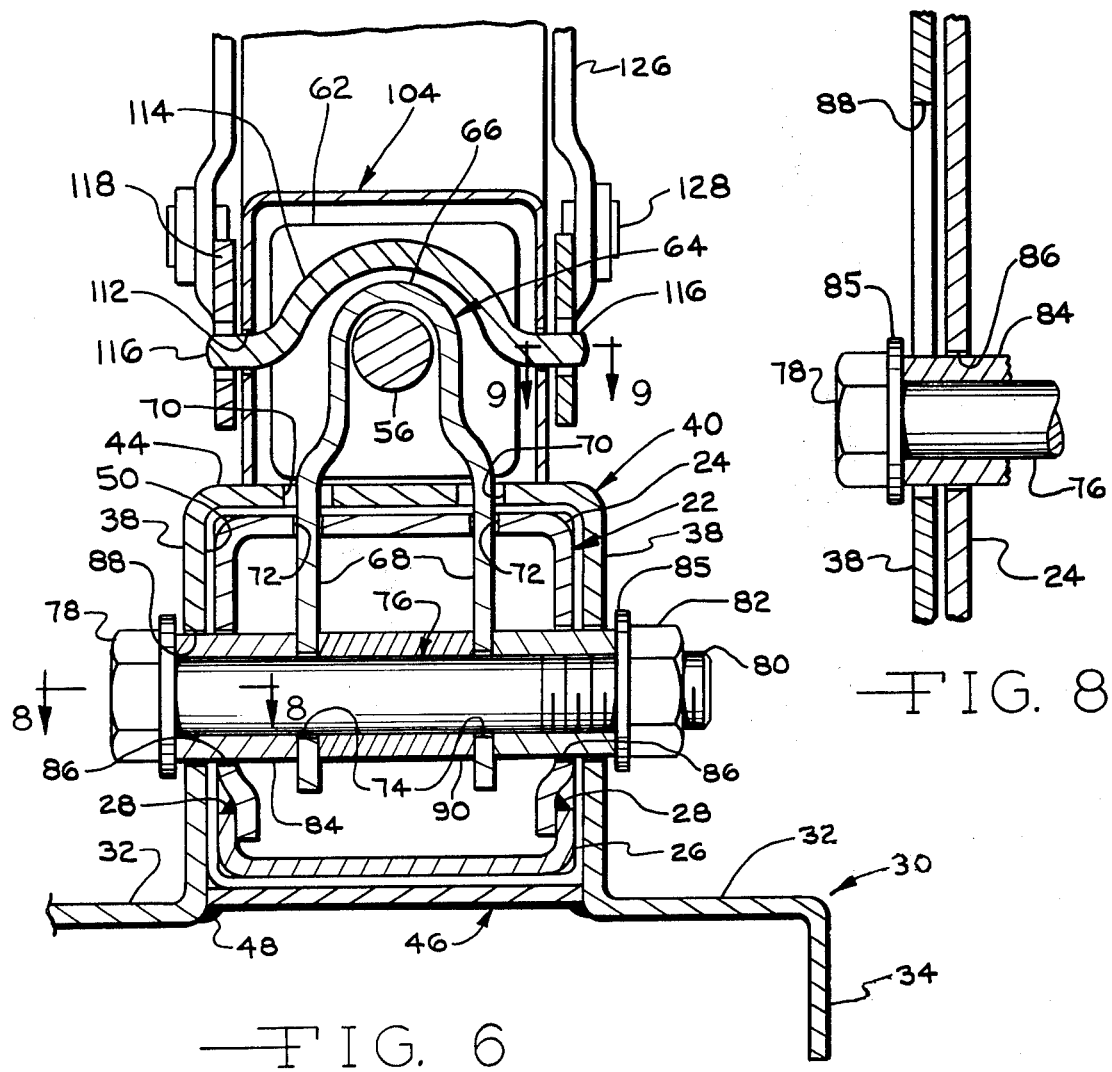
FIG. 6
FIG. 8

HITCH WITH TRAILER BRAKE ACTUATOR

This invention relates to a trailer hitch with a trailer brake actuator incorporated therein.

The new hitch employs a rear component carrying a master brake cylinder with a piston rod extending forwardly thereof. The rod has a spring connected to a position thereof and extending away from the cylinder. A rigid engaging member which is movable with a forward component of the hitch acts on the spring and so does a break-away lever linkage, so that under normal conditions and in case of a trailer separation, a maximum hydraulic pressure is applied to the trailer brakes as determined by the spring. There is no possibility then that a pressure sufficient to rupture the brake system will occur under any conditions. The rigid engaging member is connected to a piston rod of a shock absorber mounted on the rear component directly under the brake cylinder. The shock absorber in this instance is parallel to the brake cylinder rod and also to the movement of the forward components of the hitch. The shock absorber dampens movement between the front and rear components of the hitch and prevents chucking or erratic operation. The break-away lever has an over-center linkage which retains the lever in an actuating position when so moved by a flexible link connected to the towing vehicle.

The new hitch is also less expensive to produce. Each of the front and rear components can be made of a few pieces, each of which is stamped and assembled by welding. The front component has a tubular portion extending over a substantial portion of its length made of two longitudinally extending generally C-shaped parts. The rear component has a first part forming an inverted U-shaped portion which receives the tubular portion of the front component and has a second part extending across the lower ends of the legs of the inverted U-shaped part to complete a passage for the front tubular portion. The front component is slidably carried through plastic bearings mounted in the passage of the rear component.

It is, therefore, a principal object of the invention to provide a hitch with a trailer brake actuator having the features and advantages outlined above.

Other objects and advantages of the invention will be apparent from the following detailed description of a preferred embodiment thereof, reference being made to the accompanying drawings, in which:

FIG. 1 is a view in perspective of a trailer hitch according to the invention connected to portions of a towing vehicle and a towed vehicle or trailer;

FIG. 2 is an enlarged plan view of the trailer hitch of FIG. 1;

FIG. 3 is an enlarged side view in elevation of the trailer hitch;

FIG. 4 is an enlarged view in longitudinal cross section taken along the line 4—4 of FIG. 2;

FIG. 5 is a view in transverse cross section taken along the line 5—5 of FIG. 4;

FIG. 6 is an enlarged view in transverse cross section taken along the line 6—6 of FIG. 4;

FIG. 7 is an enlarged fragmentary view taken along the line 7—7 of FIG. 4;

FIG. 6 is a fragmentary view taken along the line 8—8 of FIG. 6; and

FIG. 9 is a fragmentary view taken along the line 9—9 of FIG. 6.

Referring to FIG. 1, a trailer hitch indicated at 10 is connected to a frame 12 of a towing vehicle and to an A-frame tongue 14 of a towed vehicle or trailer. The hitch can also be modified to be attached to a straight tongue of a trailer.

Referring more particularly to FIGS. 2—4, the hitch 10 includes a front or forward hitch component indicated at 16 and a rear hitch component indicated at 18. The front component 16 has a commercially-known connection 20 to connect the front component 16 to the usual trailer hitch ball mounted on the towing vehicle frame 12. To the rear of the connection 20, the forward member 16 is constructed in the form of a tube 22 of generally square shape. As best shown in FIG. 6, the tubular portion 22 is made of an upper, generally C-shaped part 24 and a lower, generally C-shaped part 26 both of which can be stamped and thereby formed relatively inexpensively. The two parts are then joined by longitudinally extending welds 28. The rear component 18 is made of a three-piece construction. Referring particularly to FIGS. 1, 2, and 6, the component 18 includes a main part 30 having horizontally extending flanges 32 and outer depending flanges 34 to accommodate the tongue 14. Rear portions of the horizontal flanges 32 are bent upwardly to form rear stiffening flanges 36 which have their inner edges affixed to legs 38 of an inverted U-shaped portion 40 by welds 42 (FIG. 2). The legs 38 (FIG. 6) are structurally integral with the horizontal flanges 32 and are connected by an upper structurally integral, horizontal web 44. A second part 46 of the rear component 18 consists of a flat strip or plate affixed to the lower ends of the legs 38 by welds 48. The part 46 and the U-shaped portion 40 of the rear component thereby form a tubular passage 50 which receives the tubular portion 22 of the forward component 16. An upright, U-shaped part 51 (FIG. 3) also is affixed on the rear portion of the web 44 by welds. The parts of the rear component can also be stamped. It will thus be seen that the two components 16 and 18 are made with minimum parts and with parts which are readily formed by relatively low cost stamping operations.

A commercially available master brake cylinder 52 is mounted inside the U-shaped part 51 located on top of the web 44. The brake cylinder can be connected to the brakes of the towed vehicle through a suitable fitting 54 with the pressure built up in the brake system through a piston in the cylinder 52 having a piston rod 56 (FIGS. 4 and 6) extending forwardly thereof. A seating flange 58 is suitably affixed to a portion of the rod 56 spaced from the cylinder 52 with a spring 60 having an end seated against the flange 58 and extending in a direction away from the cylinder 52. A square pressure member or washer 62 is located at the other end of the spring 60 and is also carried on the brake rod 56 which extends forwardly thereof. The flange 58 can be threadedly mounted on the brake rod 56 to adjust the position of the spring 60 or the flange can be welded on the rod, the spring being selected to match the desired maximum hydraulic pressure.

An inverted U-shaped, rigid engaging member 64 is located in front of the washer 62, having a web 66 extending over the rod 56 and a pair of depending legs 68 extending downwardly through slots 70 (FIG. 7 also) in the web 44 of the inverted U-shaped portion 40 of the part 30 of the rear component 18. The legs 68 also extend through openings 72 in the C-shaped part 24 of the tubular portion 22 of the front component 16. The rigid engaging member 64 can thus move back and forth with the component 16, toward and away from the master cylinder 62 to apply compressive forces to the spring 60. The lower ends of the legs 68 have openings 74 which receive a pin or bolt 76 having a head 78 and a threaded end 80 on which is turned a nut 82. Cylindrical spacers 84 are located on the bolt 76 between the legs 68 and washers 85 positioned adjacent the head 78 and the nut 82. The bolt and spacers extend through circular openings 86 in the tubular portion 22 and through slots 88 in the legs 38 of the U-shaped portion 40. The pin or bolt 76 can thus move with the front component 16 relative to the rear component 18, as does the U-shaped member 64.

A shock absorber eye 90 is located on the bolt 76 between the legs 68 and is affixed to a shock absorber piston rod 92 which extends into a shock absorber 94. The shock absorber 94 is pivotally mounted at the opposite end by a pin 96 in the U-shaped portion 40 of the rear component 18. The shock absorber body in thus stationary relative to the master cylinder 52 and is parallel to the piston rod 56 and to the tubular portion of the front component 16, as well as parallel to the movement of the front component 16. With the shock absorber 94 mounted directly under the master cylinder 52, spaced requirements are minimized and the hitch 10 can be made smaller than many previously known hitches.

Square plastic bearings 98 (FIG. 5) are located in the passage 50 and have circular bosses or projections 100 extending into mating openings 102 in the U-shaped portion 40 and the strip 46 to hold the bearings in place. The inner surfaces of the bearings are smooth to slidably receive the tubular portion 22 of the front component 16 and minimize friction.

In the operation of the trailer hitch 10, as the towed vehicle tends to close the distance between it and the pulling vehicle, the component 18 moves toward the component 16 with the tubular portion 22 specifically moving further into the passage 50 formed by the U-shaped portion 40 and the part 46. This causes the engaging member 64 to move toward the master cylinder 52 and place compressive force through the member 62 on the spring 60. As the force builds up on the spring 60, the piston rod 56 is moved into the cylinder 52 to apply pressure to the hydraulic fluid therein. This pressure increases as the component 16 moves further into the component 18, but the maximum amount of movement is achieved when the pin 76 and specifically the spacers 84 thereon engage the rear ends of the slots 88. At this time, a maximum compressive force is applied to the spring 60 and a maximum pressure is build up in the brake system. By determining the size of the spring 60 and the position of the spring 60 on the rod 56, the hydraulic pressure is controlled to less than a bursting pressure. Since the engaging member 64 is connected directly to the shock absorber rod 92, the relative movement of the component 16 toward the component 18 is damped to prevent erratic operation or chucking.

A cover 104 is located on the rear component 18 and is suitably affixed by rear bolts 106 and by a front lip 108 (FIG. 4) extending under a flange 110. The cover has slots 112 (FIGS. 3, 6, and 9) therein through which ends of an inverted, shallow, U-shaped member 114 extend. The inverted U-shaped member 114 is positioned above the rigid engaging member 64 and engages the square washer 62 above the rigid member. Outer ends 116 of the member 114 are received in lower ends of a break-away lever 118 having a connecting web 120 connected to a flexible link or break-away cable 122, the other end of which is suitably affixed to the towing vehicle. An intermediate portion of the lever 118 is pivotally connected by pins 124 to links 126, the other ends of which are pivotally connected at fixed positions to the cover 104 by pins 128.

If the towing vehicle and towed vehicle become separated, the flexible link 122 pulls the break-away lever 118 in a counterclockwise direction as viewed in FIG. 3. This movement causes the lever 118 to pivot about the pin 124 and causes the member 114 to move rearwardly to apply pressure to the spring 60, the ends 116 of the member being guided in the slots 112. When the lever reaches the maximum forward position, the ends of the member 114 preferably will be slightly above a line through the pins 124 and 128, thus placing the lever 118 in an over-center position where it remains until physically pulled in the opposite direction once again. The brakes thus remain applied until the lever is released.

Whether the rigid member 64 applies force to the washer 62 or whether the member 114 does, all force on the hydraulic fluid is applied through the spring 60 to control the bursting pressure of the hydraulic fluid. The same maximum pressure will be obtained when the trailer is backed up and hits an obstruction, for example.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. A trailer hitch for connecting a trailer and a towing vehicle, said hitch comprising a forward component adapted to be connected to the towing vehicle, a rear component adapted to be connected to the trailer, means associated with said forward and rear components for providing relative movement between them in a direction toward and away from one another, a brake cylinder carried by one of said components, a brake piston rod extending outwardly from said cylinder toward the other component, a spring connected to said brake rod at a point spaced from said brake cylinder and extending in a direction away from said brake cylinder, an engaging member movable with the other of said components for engaging said spring to resiliently urge the brake rod into said brake cylinder, stop means cooperating with said engaging members for limiting relative movement of said engaging member toward said spring, to establish a predetermined maximum compressive force on said spring, with said spring providing maximum pressure through and brake rod on hydraulic fluid in said cylinder which is less than the bursting pressure on a hydraulic system with which said cylinder communicates, and a break-away lever pivotally mounted on the same component as said brake cylinder, said lever having means being positioned to actuate said brake rod through said spring when said lever is moved by a flexible member attached to the towing vehicle.

2. A trailer hitch according to claim 1 characterized by said break-away lever having a member for actuating said spring and having and over-center linkage having one portion pivotally held by the same component as said brake cylinder and having another portion pivotally connected to said break-away lever to a portion spaced from said spring actuating member to maintain engagement with said spring when said lever is moved by the flexible member, whereby the lever will remain in the position to which it is moved by said flexible member.

3. A trailer hitch according to claim 1 characterized by said stop means comprising a pin connected with said engaging member and extending into at least one slot formed in said one component.

4. A trailer hitch according to claim 3 characterized by a shock absorber having one end connected to said pin and the other end connected to said one component.

5. A trailer hitch according to claim 3 characterized by said engaging member being of generally inverted U-shaped configuration with the legs connected to said pin and with a web extending above said brake piston rod.

6. A trailer hitch according to claim 5 characterized by said other component having openings through which the legs of said U-shaped engaging member extend to cause the legs to move with said other component.

7. A trailer hitch according to claim 1 characterized by a shock absorber having one end connected to said engaging member and the other end connected to said one component.

8. A trailer hitch according to claim 7 characterized by said shock absorber being parallel to said brake piston rod and located directly below said brake piston rod and said brake cylinder.

9. A trailer hitch for connecting a trailer and a towing vehicle, said hitch comprising a forward component adapted to be connected to the towing vehicle, a rear component adapted to be connected to the trailer, said components being relatively movable toward and away from one another, a brake cylinder carried by one of said components, a brake piston rod extending outwardly from said cylinder, a spring connected to said brake rod at a point spaced from said cylinder so that said spring is compressed as said brake rod is moved into said cylinder, washer means adjacent an end of said spring spaced from its connection to said brake rod, a shock absorber carried by said one component, a shock absorber piston rod extending outwardly from said shock absorber and carrying a pin, rigid engaging means mounted on said pin and engageable with said washer means on the side thereof opposite said spring, said one component having slots extending parallel to said shock absorber rod, said pin extending into said slots, said slots thereby limiting the maximum extent of movement of said pin in a direction toward said brake cylinder.

10. A trailer hitch according to claim 9 characterized by a break-away lever carried by said one component, a transverse member carried by said break-away lever and positioned to engage said washer means on the side thereof opposite said spring, and over-center means for holding said lever in an engaging position when so moved by a flexible member connected to the towing vehicle.

11. A trailer hitch according to claim 9 characterized by said shock absorber piston rod being parallel to said brake piston rod and to the direction of movement of said other component.

12. A trailer hitch according to claim 11 characterized by said shock absorber and said shock absorber piston rod being substantially directly below said brake cylinder and said brake piston rod.

13. A trailer hitch according to claim 9 characterized by said other component having an opening through which said rigid engaging means extends to cause said engaging means to move with said other component.

14. A trailer hitch according to claim 9 characterized further by said other component having additional slots through which said rigid engaging means extends, said additional slots being between said pin and said brake piston rod.

15. A trailer hitch for connecting a towed vehicle and a towing vehicle, said hitch comprising a forward component adapted to be connected to the towing vehicle and a rear component adapted to be connected to the towed vehicle, said forward component being substantially tubular throughout a substantial portion of its length, said rear component including a pair of generally horizontally extending flanges and an inverted U-shaped portion structurally integral with the two flanges and of a size and shape to receive the tubular portion of said forward component, said flanges having rear turned up stiffening flanges with inner edges thereof affixed to the legs of said inverted U-shaped portion, and a strip member extending between lower end portions of the legs of said inverted U-shaped portion and affixed thereto below said tubular portion of said forward component.

16. A trailer hitch for connecting a towed vehicle and a towing vehicle, said hitch comprising a forward component adapted to be connected to the towing vehicle and a rear component adapted to be connected to the towed vehicle, said forward component being substantially tubular throughout a substantial portion of its length, said rear component including a pair of generally horizontally extending flanges and an inverted U-shaped portion structurally integral with the two flanges and of a size and shape to receive the tubular portion of said forward component, said flanges having rear turned up stiffening flanges with inner edges thereof affixed to the legs of said inverted U-shaped portion, a brake cylinder mounted on top of said inverted U-shaped portion and having a brake cylinder piston rod extending forwardly thereof, and a shock absorber connected to side walls of said U-shaped portion to the rear of said forward component and aligned with said forward component.

17. A trailer hitch according to claim 16 characterized by a rigid member connected to a piston rod of said shock absorber and engageable with said brake cylinder piston rod.

18. A trailer hitch according to claim 16 characterized by said shock absorber being located substantially directly below said brake cylinder.

19. A trailer hitch according to claim 16 characterized by said shock absorber extending partly into said tubular portion of said forward component and positioned parallel to said tubular portion.

* * * * *

UNITED STATES PATENT OFFICE
CERTIFICATE OF CORRECTION

PATENT NO. : 3,881,577
DATED : May 6, 1975
INVENTOR(S) : Joseph L. Wherry and Eugene DeAngelis It is certified that error appears in the above-identified patent and that said Letters Patent are hereby corrected as shown below:

Column 1, lines 6 & 7, change "position" to --portion--.
         Line 32, after "longitudinally" insert a hyphen.
         Line 63, change "6" to --8--.

Column 2, line 19, after "longitudinally" insert a hyphen.
         Line 20, "The" begins a new paragraph.
         Line 23, after "horizontally" insert a hyphen.
         Line 44, after "commercially" insert a hyphen.

Column 3, line 21, change "in" to --is--.

Column 4, line 18, change "the" to --its--.
         Line 54, change "members" to --member--.
         Line 58, change "and" to --said--.

Column 5, line 3, change "and" to --an--.
         Line 7, after "spring" insert a hyphen.

Column 6, line 26, after "horizontally" insert a hyphen.
         Line 43, after "horizontally" insert a hyphen.

Signed and Sealed this fifth Day of August 1975

[SEAL]

Attest:

RUTH C. MASON
Attesting Officer

C. MARSHALL DANN
Commissioner of Patents and Trademarks